(12) United States Patent
Martchenko et al.

(10) Patent No.: US 12,488,359 B2
(45) Date of Patent: *Dec. 2, 2025

(54) SYSTEMS AND METHODS FOR SELECTIVELY MODIFYING WEB CONTENT

(71) Applicant: SDL Netherlands B.V., Amsterdam Zuidoost (NL)

(72) Inventors: Serguei Martchenko, Duivendrecht (NL); Marvin Smit, Almere (NL); Rick Pannekoek, Amsterdam (NL); Erik de Voogd, Moordrecht (NL); Renze A. de Vries, Amsterdam (NL)

(73) Assignee: SDL Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,585

(22) Filed: Apr. 30, 2024

(65) Prior Publication Data

US 2024/0311850 A1    Sep. 19, 2024

Related U.S. Application Data

(63) Continuation of application No. 18/136,839, filed on Apr. 19, 2023, now Pat. No. 12,026,727, which is a
(Continued)

(51) Int. Cl.
*G06Q 30/02* (2023.01)
*G06Q 30/0251* (2023.01)

(52) U.S. Cl.
CPC ......... *G06Q 30/02* (2013.01); *G06Q 30/0255* (2013.01)

(58) Field of Classification Search
CPC ........................... G06Q 30/02; G06Q 30/0255
See application file for complete search history.

(56) References Cited

U.S. PATENT DOCUMENTS

| 5,477,451 A | 12/1995 | Brown et al. |
| 6,330,566 B1 | 12/2001 | Durham |

(Continued)

FOREIGN PATENT DOCUMENTS

| JP | 2001117847 A | 4/2001 |
| JP | 2001136583 A | 5/2001 |

(Continued)

OTHER PUBLICATIONS

O. Ogunlana and Xiao-Chun Cheng, "E-marketing and digital communications: Implementing an effective knowledge based targeted e-marketing campaign," 2009 International Conference on Machine Learning and Cybernetics, Baoding, China, pp. 3566-3573, doi: 10.1109/ICMLC.2009.5212808. (Year: 2009).*

(Continued)

*Primary Examiner* — Waseem Ashraf
*Assistant Examiner* — Christopher C Busch
(74) *Attorney, Agent, or Firm* — Carr & Ferrell LLP

(57) ABSTRACT

Systems and methods for selectively modifying web content are provided. An exemplary method includes providing a web content management application via a web site, the web content management application coupled to a web server associated with the web site, the web content management application adapted to maintain a global marketing framework indicative of a marketing campaign; generating a web marketing campaign from at least a portion of the global marketing framework; gathering marketing data from at least one of the web server associated with the web marketing campaign and consumer devices accessing the web marketing campaign, the marketing data including information indicative of interests of consumers; storing the marketing data in a database; analyzing the marketing data; and based upon the analysis of the marketing data, selectively and dynamically modifying the web content of the web
(Continued)

marketing campaign to substantially correspond to the interests of the consumers.

20 Claims, 5 Drawing Sheets

Related U.S. Application Data continuation of application No. 17/546,029, filed on Dec. 8, 2021, now Pat. No. 11,694,215, which is a continuation of application No. 16/742,689, filed on Jan. 14, 2020, now Pat. No. 11,301,874, which is a continuation of application No. 13/016,989, filed on Jan. 29, 2011, now Pat. No. 10,657,540.

(56) References Cited

U.S. PATENT DOCUMENTS

| | | |
|---|---|---|
| 6,477,575 B1 | 11/2002 | Koeppel et al. |
| 7,392,255 B1 | 6/2008 | Sholtis et al. |
| 7,464,086 B2 | 12/2008 | Black et al. |
| 7,606,814 B2 | 10/2009 | Deily et al. |
| 7,698,126 B2 | 4/2010 | Kohlmeier et al. |
| 7,975,255 B2 * | 7/2011 | Kosov ............ G06Q 10/10 |
| | | 717/104 |
| 8,036,929 B1 | 10/2011 | Reisman |
| 8,185,830 B2 | 5/2012 | Saha et al. |
| 8,229,977 B1 | 7/2012 | Anderson et al. |
| 8,260,846 B2 | 9/2012 | Lahav |
| 8,413,045 B2 | 4/2013 | Lemonik et al. |
| 8,489,980 B2 | 7/2013 | Lakritz |
| 8,671,214 B2 | 3/2014 | Lockhart et al. |
| 8,676,804 B1 | 3/2014 | Janos et al. |
| 8,725,559 B1 * | 5/2014 | Kothari ............ G06Q 90/00 |
| | | 705/14.1 |
| 8,799,200 B2 | 8/2014 | Lahav |
| 8,954,539 B2 | 2/2015 | Lahav |
| 9,317,622 B1 | 4/2016 | Zuromski et al. |
| 9,336,487 B2 | 5/2016 | Lahav |
| 9,369,489 B2 | 6/2016 | Kato |
| 9,396,436 B2 | 7/2016 | Lahav |
| 9,471,920 B2 | 10/2016 | Kolkowitz et al. |
| 9,519,682 B1 | 12/2016 | Pujara et al. |
| 9,547,626 B2 | 1/2017 | de Voogd |
| 10,007,646 B1 | 6/2018 | Colborn et al. |
| 10,061,749 B2 | 8/2018 | Homer et al. |
| 10,521,492 B2 | 12/2019 | Homer et al. |
| 10,580,015 B2 | 3/2020 | Erasmus et al. |
| 10,657,540 B2 | 5/2020 | Martchenko et al. |
| 10,990,644 B2 | 4/2021 | Homer et al. |
| 11,044,949 B2 | 6/2021 | Homer et al. |
| 11,182,455 B2 | 11/2021 | Siddiquee et al. |
| 11,301,874 B2 | 4/2022 | Martchenko et al. |
| 11,694,215 B2 | 7/2023 | Martchenko et al. |
| 12,026,727 B2 | 7/2024 | Martchenko et al. |
| 12,437,023 B2 | 10/2025 | Siddiquee et al. |
| 2002/0103698 A1 | 8/2002 | Cantrell |
| 2002/0112013 A1 | 8/2002 | Walsh |
| 2002/0133392 A1 | 9/2002 | Angel et al. |
| 2002/0178166 A1 | 11/2002 | Hsia |
| 2002/0178257 A1 | 11/2002 | Cerrato |
| 2003/0023757 A1 | 1/2003 | Ishioka et al. |
| 2003/0163346 A1 | 8/2003 | Tinti et al. |
| 2004/0010496 A1 | 1/2004 | Behrendt et al. |
| 2004/0015408 A1 | 1/2004 | Rauen et al. |
| 2004/0024739 A1 | 2/2004 | Copperman et al. |
| 2004/0044576 A1 | 3/2004 | Kurihara et al. |
| 2004/0068435 A1 | 4/2004 | Braunzell |
| 2004/0148318 A1 * | 7/2004 | Taylor ............ G06F 16/958 |
| | | 707/999.203 |
| 2005/0086105 A1 | 4/2005 | McFadden et al. |
| 2005/0156714 A1 | 7/2005 | McCarthy et al. |
| 2005/0203884 A1 | 9/2005 | Allen et al. |
| 2005/0228865 A1 | 10/2005 | Hirsch |
| 2005/0235351 A1 | 10/2005 | Seltzer et al. |
| 2006/0031233 A1 | 2/2006 | Liu et al. |
| 2006/0080257 A1 | 4/2006 | Vaughan et al. |
| 2007/0016363 A1 | 1/2007 | Huang et al. |
| 2007/0022003 A1 | 1/2007 | Chao et al. |
| 2007/0033104 A1 | 2/2007 | Collins et al. |
| 2007/0083425 A1 | 4/2007 | Cousineau et al. |
| 2007/0118545 A1 | 5/2007 | Chandrasekharan et al. |
| 2007/0207785 A1 * | 9/2007 | Chatterjee ......... H04M 3/53333 |
| | | 455/414.1 |
| 2007/0208991 A1 | 9/2007 | Rider |
| 2007/0226058 A1 | 9/2007 | Lorenzen et al. |
| 2007/0234213 A1 | 10/2007 | Krikorian et al. |
| 2008/0195664 A1 | 8/2008 | Maharajh et al. |
| 2008/0209320 A1 | 8/2008 | Mawhinney et al. |
| 2008/0244053 A1 | 10/2008 | Sampson et al. |
| 2008/0316228 A1 | 12/2008 | Seljavaara |
| 2009/0061764 A1 | 3/2009 | Lockhart et al. |
| 2009/0099931 A1 | 4/2009 | Aaltonen et al. |
| 2009/0171780 A1 | 7/2009 | Aldrey et al. |
| 2009/0222117 A1 * | 9/2009 | Kaplan ............ G06Q 50/184 |
| | | 705/26.1 |
| 2010/0017704 A1 | 1/2010 | Jaffe et al. |
| 2010/0023338 A1 | 1/2010 | Petronelli et al. |
| 2010/0023475 A1 | 1/2010 | Lahav |
| 2010/0023581 A1 | 1/2010 | Lahav |
| 2010/0070364 A1 | 3/2010 | Dugan |
| 2010/0070847 A1 | 3/2010 | Hampton et al. |
| 2010/0153404 A1 | 6/2010 | Ghosh et al. |
| 2010/0233996 A1 | 9/2010 | Herz et al. |
| 2010/0242069 A1 | 9/2010 | Jung et al. |
| 2010/0274661 A1 | 10/2010 | Aaltonen et al. |
| 2010/0281008 A1 | 11/2010 | Braunwarth |
| 2010/0312619 A1 | 12/2010 | Ala-Pietila et al. |
| 2011/0004697 A1 | 1/2011 | Tezuka et al. |
| 2011/0010243 A1 | 1/2011 | Wilburn et al. |
| 2011/0087540 A1 | 4/2011 | Krishnan et al. |
| 2011/0099077 A1 | 4/2011 | Darin et al. |
| 2011/0161312 A1 | 6/2011 | Wallman |
| 2011/0264519 A1 * | 10/2011 | Chan ............ G06Q 30/0251 |
| | | 705/14.49 |
| 2011/0264736 A1 | 10/2011 | Zuckerberg et al. |
| 2012/0042006 A1 | 2/2012 | Kiley et al. |
| 2012/0096366 A1 | 4/2012 | Narla et al. |
| 2012/0136718 A1 * | 5/2012 | Katti ............ G06Q 30/0251 |
| | | 705/14.49 |
| 2012/0143816 A1 | 6/2012 | Zhang et al. |
| 2012/0158485 A1 | 6/2012 | Ogawa |
| 2012/0185759 A1 | 7/2012 | Balinsky et al. |
| 2012/0197718 A1 | 8/2012 | Martchenko et al. |
| 2012/0197957 A1 | 8/2012 | de Voogd |
| 2012/0198351 A1 | 8/2012 | Lee et al. |
| 2012/0203861 A1 | 8/2012 | Flack et al. |
| 2012/0216108 A1 | 8/2012 | Yambal et al. |
| 2012/0221407 A1 | 8/2012 | Erasmus et al. |
| 2012/0226818 A1 | 9/2012 | Atas et al. |
| 2012/0233665 A1 | 9/2012 | Ranganathan et al. |
| 2012/0266076 A1 | 10/2012 | Lockhart et al. |
| 2013/0031470 A1 | 1/2013 | Daly, Jr. et al. |
| 2013/0036202 A1 | 2/2013 | Lahav |
| 2013/0054404 A1 | 2/2013 | Garcia |
| 2013/0097488 A1 | 4/2013 | Coman et al. |
| 2013/0124987 A1 | 5/2013 | Lakritz |
| 2013/0151940 A1 | 6/2013 | Bailor et al. |
| 2014/0087760 A1 | 3/2014 | Bennett |
| 2014/0173414 A1 | 6/2014 | Chan et al. |
| 2014/0188993 A1 | 7/2014 | Klein et al. |
| 2014/0236942 A1 | 8/2014 | Li |
| 2014/0250369 A1 | 9/2014 | Mitnick et al. |
| 2014/0282977 A1 | 9/2014 | Madhu et al. |
| 2014/0298483 A1 | 10/2014 | Kato |
| 2014/0304080 A1 | 10/2014 | Yilmaz |
| 2014/0310229 A1 | 10/2014 | Lahav |
| 2014/0351053 A1 | 11/2014 | Link, II |
| 2015/0040000 A1 | 2/2015 | Rice et al. |
| 2015/0074518 A1 | 3/2015 | Rumsey et al. |
| 2015/0106390 A1 | 4/2015 | Fuchs |
| 2015/0127660 A1 | 5/2015 | Zilberberg et al. |
| 2015/0149455 A1 | 5/2015 | Whitley, Jr. |

(56) References Cited

U.S. PATENT DOCUMENTS

| | | |
|---|---|---|
| 2015/0149885 A1 | 5/2015 | Homer et al. |
| 2015/0149886 A1 | 5/2015 | Homer et al. |
| 2015/0188961 A1 | 7/2015 | Ricci |
| 2015/0213363 A1 | 7/2015 | Lahav |
| 2015/0248484 A1 | 9/2015 | Yu et al. |
| 2015/0254732 A1 | 9/2015 | Snyder |
| 2015/0310504 A1 | 10/2015 | Potter |
| 2016/0019546 A1 | 1/2016 | Eisen |
| 2016/0057195 A1 | 2/2016 | Jaskiewicz |
| 2016/0103835 A1 | 4/2016 | Zupancic |
| 2016/0155178 A1 | 6/2016 | Konaiyagarri et al. |
| 2016/0239496 A1 | 8/2016 | Motte et al. |
| 2016/0283952 A1 | 9/2016 | Hall |
| 2016/0371693 A1 | 12/2016 | Kolkowitz et al. |
| 2017/0235848 A1 | 8/2017 | Van Dusen et al. |
| 2018/0314674 A1 | 11/2018 | Homer et al. |
| 2019/0065514 A1 | 2/2019 | Siddiquee et al. |
| 2019/0163459 A1 | 5/2019 | Sreenivasa et al. |
| 2020/0104343 A1 | 4/2020 | Homer et al. |
| 2020/0151740 A1 | 5/2020 | Martchenko et al. |
| 2022/0043868 A1 | 2/2022 | Siddiquee et al. |
| 2022/0101343 A1 | 3/2022 | Martchenko et al. |
| 2023/0259956 A1 | 8/2023 | Martchenko et al. |

FOREIGN PATENT DOCUMENTS

| | | |
|---|---|---|
| JP | 2001188992 A | 7/2001 |
| JP | 2001350790 A | 12/2001 |
| JP | 2002073677 A | 3/2002 |
| JP | 2002132822 A | 5/2002 |
| JP | 2003032660 A | 1/2003 |
| JP | 2003216608 A | 7/2003 |
| JP | 2004538542 A | 12/2004 |
| JP | 2005056080 A | 3/2005 |
| JP | 2005174120 A | 6/2005 |
| JP | 2005267535 A | 9/2005 |
| JP | 2006260329 A | 9/2006 |
| JP | 2008027265 A | 2/2008 |
| JP | 2009020845 A | 1/2009 |
| JP | 2009518761 A | 5/2009 |
| JP | 2009301480 A | 12/2009 |
| JP | 2010152588 A | 7/2010 |
| JP | 2011002905 A | 1/2011 |
| WO | WO2003081441 A1 | 10/2003 |
| WO | WO20070118424 A1 | 10/2007 |

OTHER PUBLICATIONS

Anonymous; "MyYahoo!—RSS Headlines Module—Frequently Asked Questions," Jan. 24, 2007, XP002508567, [retrieved on Dec. 17, 2008], Retrieved from the Internet: <URL:http://web.archive.org/web/20040124175>, 4 pages.

Krishnan, "Unmittelbare Ergebnisse Noch Schneller: Google Vorschau—Der Google Produkt-Kompass," Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages.

"XML Convert," Unidex, Inc., Aug. 4, 2007, <http://www.unidex.com/xflat.htm> accessed on Apr. 5, 2012, 1 page.

"SOAP," Wikipedia, Jan. 22, 2011, <http://en.wikipedia.org/w/index.php?title=SOAP&oldid=409349976> accessed on Apr. 4, 2012, 5 pages.

Mutz et al., "User-Agent Display Attributes," HTTP Working Group, Nov. 26, 1996, 6 pages.

XP007905525, The Technical Aspects Identified in the Present Application (Art. 15 PCT) are considered part of common general knowledge. Due to their notoriety no documentary evidence is found to be required. Official Journal Nov. 2007, pp. 592-593.

"Serialization"; Wikipedia; Nov. 14, 2013; 10 pages; https://web.archive.org/web/20131114152415/http://en.wikipedia.org/wiki/Serialization.

Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs 110).aspx.

"Web analytics," Wikipedia [online], Jan. 27, 2001 [retrieved on Sep. 11, 2017], Retrieved from the Internet: <URL: https://en.wikipedia.org/w/index.php?title=Web_analytics&oldid=410384013>, 11 pages.

"Examining Division Preliminary Opinion," European Patent Application No. 12703483.3, Apr. 30, 2018, 9 pages.

Eckerson, Wayne, "Performance Management Strategies: How to Create and Deploy Effective Metrics," TDWI Best Practices Report, First Quarter (2009), 35 pages.

Hasegawa et al., "Multilingual Disaster Information System: Information Delivery Using Graphic Text for Mobile Phones," AI & Soc 19, 2005, pp. 265-278.

Wikipedia: "XML" [online], [retrieved on Mar. 2, 2020], Retrieved from the Internet: <https://www.wikipedia.com/XML> 2 pages.

"Serialization (C#)", Microsoft, <https://msdn.microsoft.com/en-us/library/mt656716.aspx>, Jan. 2, 2020, 4 pages.

"What are object serialization and deserialization?" Stack Overflow, <http://stackoverflow.com/questions/1360632/object-serialization-anddeserialization>, Sep. 1, 2009, 6 pages.

"Java Serialization and Deserialization", Studytonight, <http://www.studytonight.com/java/serialization-and-deserialization.php>, 2020, Accessed Oct. 23, 2020, 7 pages.

Upadhyay, Chirantan, "Serialization and Deserialization in asp.net with C#", Code Project, <https://www.codeproject.com/kb/cs/seranddeserialization.aspx>, May 27, 2009, 7 pages.

"Serialize", PHP, <http://php.net/manual/en/function.serialize.php>, accessed Oct. 23, 2020, 28 pages.

"Interface Serializable", Oracle, <http://docs.oracle.com/javase/7/docs/api/java/io/Serializable.html>, accessed Oct. 23, 2020, 3 pages.

Adomavicius et al., "Context-Aware Recommender Systems", AI Magazine, 2011, 14 pages.

"Oracle ATG Web Commerce—Introduction," Oracle Corporation; Accessed Jan. 19, 2021 from https:// docs.oracle.com/cd/E35319_01/Platform.10-2/ATGPlatformProgGuide/html/s0101 introduction01.html; Year: 2013; 2 pages.

"HTML (Hypertext Markup Language) Definition;" Sharpened Productions; Accessed Jan. 19, 2021 from https://techterms.com/definition/html; May 23, 2015; 2 pages.

* cited by examiner

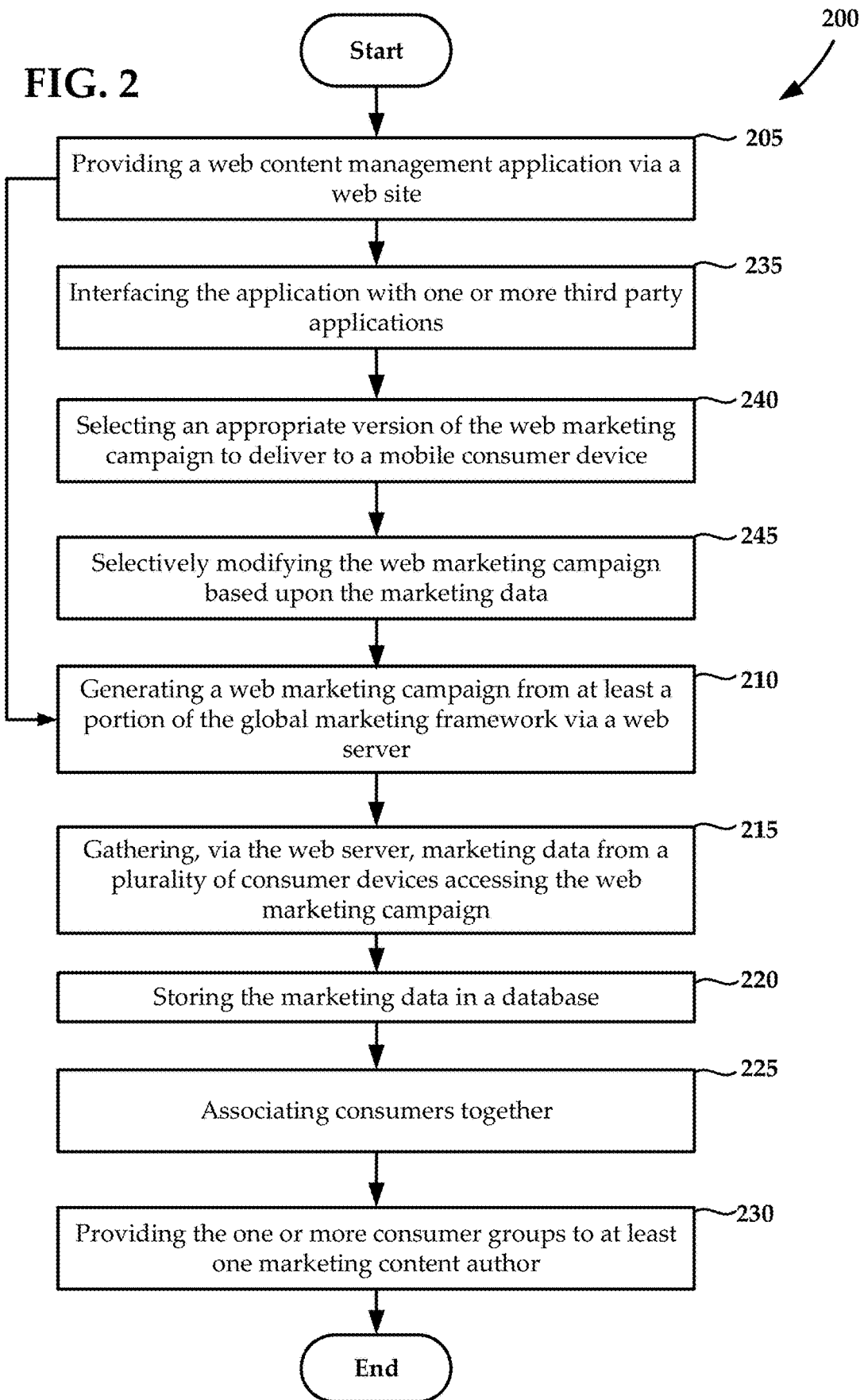

SYSTEMS AND METHODS FOR SELECTIVELY MODIFYING WEB CONTENT

CROSS-REFERENCE TO RELATED APPLICATIONS

This nonprovisional patent application is a continuation application of U.S. patent application Ser. No. 18/136,839, filed on Apr. 19, 2023, now granted U.S. Pat. No. 12,026,727, issued on Jul. 2, 2024, titled "SYSTEMS AND METHODS FOR MANAGING AND MODIFYING WEB CONTENT," which is a continuation application of U.S. patent application Ser. No. 17/546,029, filed on Dec. 8, 2021, now granted U.S. Pat. No. 11,694,215 issued Jul. 4, 2023, titled "SYSTEMS AND METHODS FOR MANAGING WEB CONTENT," which is a continuation application of U.S. patent application Ser. No. 16/742,689, filed on Jan. 14, 2020, now granted U.S. Pat. No. 11,301,874, issued on Apr. 12, 2022, titled "SYSTEMS AND METHODS FOR MANAGING WEB CONTENT AND FACILITATING DATA EXCHANGE," which is a continuation of U.S. patent application Ser. No. 13/016,989 filed on Jan. 29, 2011, now granted U.S. Pat. No. 10,657,540, issued on May 19, 2020, titled "SYSTEMS, METHODS, AND MEDIA FOR WEB CONTENT MANAGEMENT," all of which are hereby incorporated herein by reference in their entirety including all references cited therein. This nonprovisional patent application is also related to U.S. patent application Ser. No. 13/016,988 filed on Jan. 29, 2011, now granted U.S. Pat. No. 9,547,626, issued on Jan. 17, 2017, titled "SYSTEMS, METHODS, AND MEDIA FOR MANAGING AMBIENT ADAPTABILITY OF WEB APPLICATIONS AND WEB SERVICES," which is hereby incorporated herein by reference in its entirety including all references cited therein.

FIELD OF THE INVENTION

The present technology relates generally to web content management, and more specifically, but not by way of limitation, to systems, methods, and media for web content management.

BACKGROUND OF THE INVENTION

Generally speaking, the content of a website may be composed by gathering a mix of content such as textual, image, video, hyperlinks, and applications—just to name a few. These various types of content may be gathered from a variety of sources and from many different third party software tools, such as web design programs. Web content that is created specifically for distribution through web sources, such as a website, may be created in utilizing, for example, a content manager explorer (CME).

Content authors may desire access to information related to the design of web content stored in other systems (e.g., the third party software) that they desire to make use of in the CME. Such an integration of third party software would require specific integrations of the third party software into the main CME and in some cases the core software used by end users to create, manage and publish web content to websites, also known as "CM." Unfortunately, these types of integrations may restrict the number and level of integrations possible.

Moreover, most websites are comprised of a patchwork of functionalities created directly for the website. These functionalities may be included in a web application that is utilized to operate the website. Additionally, the functionalities may be derived from third party sources (internal and external). These third party sources may provide their own code (e.g., tag libraries or application programming interfaces) that must be run in the same environment in which they were created in order for the functionality to be completely rendered by the web application. If the third party sources are not run in the same environment in which they were created, the functionalities may not operate correctly within the web page. One alternative to this requirement is for the CME to allow the use of client side rendering through at least one of hypertext markup language HTML iframe elements and web services through AJAX or JavaScript integrations that may render portions of the web page once the web service data is returned by the web application. Unfortunately, these integration methods may make it difficult to clearly separate web services code from the actual web content. Moreover, web services that utilize, for example, .NET functionalities, may not be able to effectively render third party functionalities from other sources.

SUMMARY OF THE INVENTION

According to some embodiments, the present invention is directed to systems and methods for selectively modifying web content. An exemplary method includes providing a web content management application via a web site, the web content management application coupled to a web server associated with the web site, the web content management application adapted to maintain a global marketing framework indicative of a marketing campaign; generating a web marketing campaign from at least a portion of the global marketing framework; gathering marketing data from at least one of the web server associated with the web marketing campaign and consumer devices accessing the web marketing campaign, the marketing data including information indicative of interests of consumers; storing the marketing data in a database; analyzing the marketing data; and based upon the analysis of the marketing data, selectively and dynamically modifying the web content of the web marketing campaign to substantially correspond to the interests of the consumers.

BRIEF DESCRIPTION OF THE DRAWINGS

FIG. 2 is a flow diagram of an exemplary method for managing web content.

DETAILED DESCRIPTION OF EXEMPLARY EMBODIMENTS

Figure 1A:
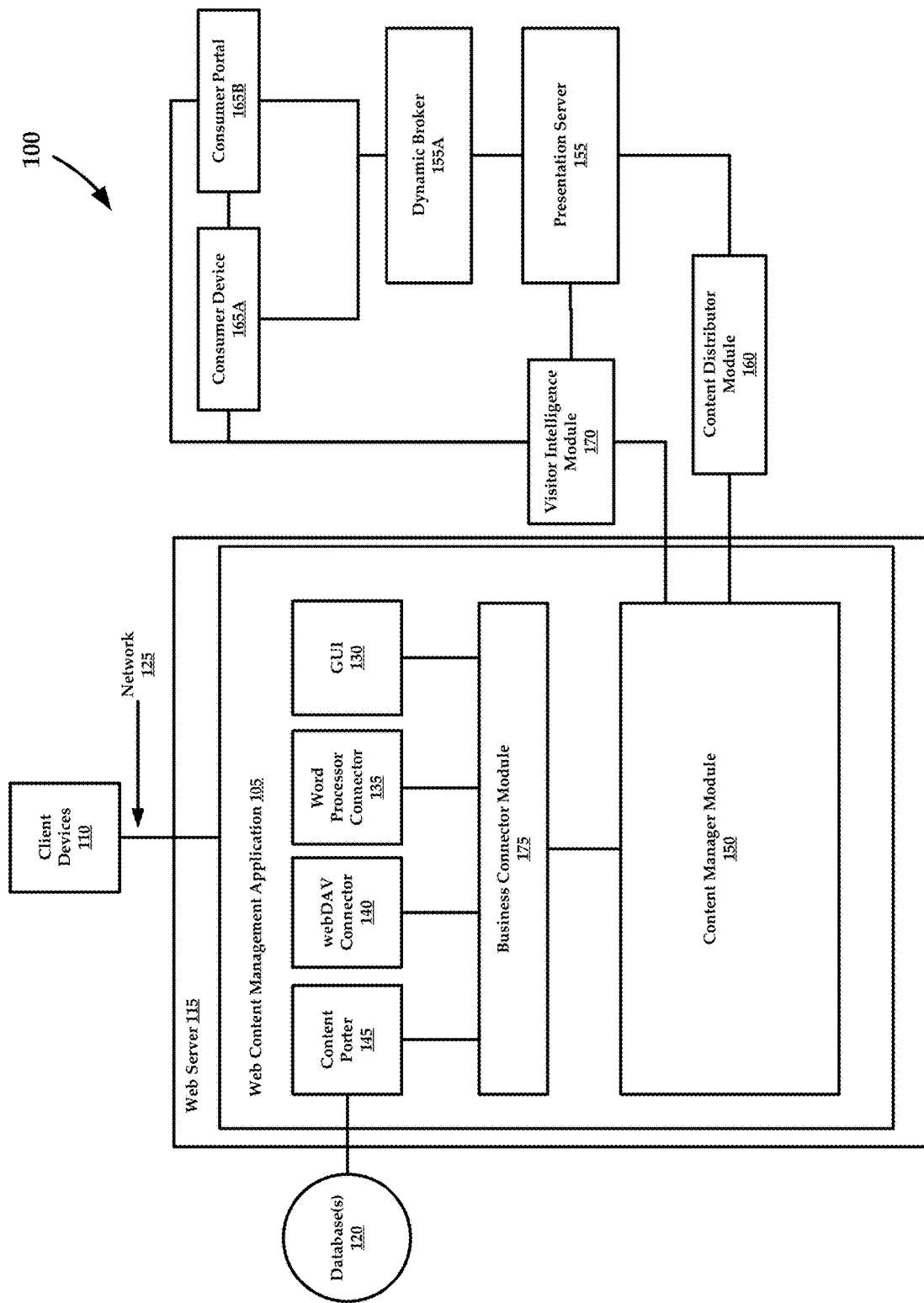
FIG. 1A is a schematic diagram of an exemplary architecture of a system for managing web content that may be utilized to practice aspects of the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Generally speaking, the systems and methods provided herein may be utilized to generate, manage, and selectively modify web content for global marketing campaigns. The systems and method maintain a global marketing framework that may be utilized to create individual web marketing campaigns across a wide variety of communications mediums. Content authors may utilize the global marketing framework in a collaborative manner and seamlessly incorporate content data created through third party applications.

The systems and methods provided herein utilize application data created in a web content management application that provides extra data storage on an item level allowing a content author to store additional web content and external other data (e.g., third party application data) directly into the web content management application. The systems and methods provide mapping between web content associated with a marketing campaign and corresponding data in third party systems, such as product information management systems.

The systems and methods may utilize simple object access protocol web services that are adapted to expose web application data and in some embodiments, affect application data associated with web content as an item transaction. The CME also includes an extensible framework that allows implementers to add extra data obtained through third parties sources/software, as well as associated third party workflow into the web content management application. It will be understood that the term "implementer" may include individuals producing computer readable instructions that may be utilized to modify the appearance or functionalities of the web content management application. These functionalities provide the content authors with one location (the web content management application) at which are able to perform actions with scope over many systems. The combination of these functionalities provides third parties, such as partners, the ability to create portable solutions to integrate third party data from third party data sources. These portable solutions may allow for customization of the web content management application across many installations of the web content management application.

The systems and methods may include a dynamic rendering engine and dynamic rendering engine data format that allows implementers to abstract dynamic functionalities to a predetermined format that is intercepted and rendered by the dynamic rendering engine. Data abstracted to the predetermined format may be utilized as a portion of a core development implementation before being passed back to the requester. According to some embodiments, the core development may include functionalities adapted to render dynamic links that ensure that a website never has broken links to internal pages associated therewith.

It will be understood that the data included in the web content generated by the web content management application is provided according to the predetermined format of the rendering engine, rather than from data format utilized by standard web applications such as JavaScripts or .NET. In some embodiments, tag libraries available to the rendering engine data format may be added in Java making it possible to render the functionalities of the web application without actually requiring the deployment of the web application.

Referring now to FIG. 1A, illustrating an exemplary system 100 for managing web content. The system 100 may include a web content management application, hereinafter referred to as the "application 105," adapted to communicate with a plurality of client devices 110. Each of the client devices 110 may be associated with a user (e.g., a content author) who provides content data that may be utilized by the application 105 to generate a global marketing framework. It will be understood that a global marketing framework may include detailed information indicative of a marketing campaign. Portions of the global marketing framework may be utilized to generate customized marketing campaigns that may be deployed across a wide range of communication channels (e.g., web, radio, television, print, and so forth). In some instances, the marketing campaign may include information, such as text, audio, video, forms, templates, user interfaces, and any additional information that may be utilized in the creation of marketing campaigns. Non-limiting examples of marketing campaigns include, banners, links, web pages, and so forth, both interactive and non-interactive.

It is noteworthy that the application 105 may be adapted to generate web marketing campaigns utilizing these customizable and multi-channel functionalities. This may be accomplished, for example, by converting data received by the content authors into widely implemented content structural formats. Such formats may include, for example, an extensible markup language format (XML) that is utilized by the application 105.

The application 105 may be implemented in the context of a web site 300 (FIG. 3) that is hosted on a web server 115. It will be understood that the web server 115 may include a single web server or a plurality of web servers networked or associated together in a cloud configuration (not shown). As will be discussed in greater detail below, the system 100 may include a presentation server 155 adapted to display the web marketing campaign generated by the application 105. A more detailed description of the basic functionalities of client devices 110, web server 115, and presentation server 155 are provided with reference to computing system 400 illustrated in FIG. 4.

In some embodiments, the web server 115 may be operatively associated with one or more databases 120. The one or more databases 120 may be configured as Object Linking and Embedding, Database (OLEDB) or Open Database Connectivity (ODBC) databases. In some embodiments, the content (e.g., global marketing framework, web marketing campaign, etc.) generated by the application 105 may be stored in the one or more databases 120. It will be understood that the client devices 110 may be operatively coupled to the application 105 via a network 125, which in some embodiments includes the Internet.

The content authors may interact with the application 105 via graphical user interfaces (GUIs) 130 generated by the application 105. According to some embodiments, the content authors may interact with the GUIs 130 via a web browser resident on the client device 110. The graphical user interfaces 130 may provide visual representations of the web marketing campaigns generated from the global marketing framework. An exemplary graphical user interface 300 is shown with reference to FIG. 3.

In additional embodiments, content authors may interact with the application 105 via a word processor connector 135 that provides a simplified mechanism for content authors to upload textual information that may be included in the global marketing framework or a web marketing campaign. For example, the word processor connector 135 may be utilized by content authors who need to create simple text for use in a web marketing campaign via any commonly utilized word processing tool. Content authors may open, edit, and create structured (XML) content by uploading a word processing document that is converted by the word processor connector 135 to structured XML content that may be utilized by the application 105. The XML content may then be saved directly to the content manager module 150, which is described in greater detail below.

Content authors may generate web marketing campaigns from the global marketing framework by inheriting portions (or potentially all) of the data of the global marketing framework. The content authors may customize the data for a web marketing campaign based upon a targeted channel of communication. For example, a content author may modify a web marketing campaign targeted to a social networking web site differently from the way the content author modifies the web marketing campaign for use with an e-commerce web site. It will be understood that inheriting may include selecting, extracting, gathering, referencing, and the like.

According to other embodiments, rather than requiring the content authors to create a plurality of individual web marketing campaigns from the global marketing framework, the application 105 may be adapted to automatically and intelligently generate individual marketing campaigns from the global marketing framework. For example, once the global marketing framework has been established, the application 105 may automatically generate web marketing campaigns in a plurality of different languages. Because the plurality of web marketing campaigns inherit their data from the global marketing framework, consistency may be maintained with regard to branding and message content.

Additionally, the application 105 may tailor the content of individual marketing campaigns based upon the desired audience. For example, the application 105 may not only generate an individual marketing campaign for a particular country based upon language utilized in the country, but may also selectively modify the appearance of the individual marketing campaign based upon marketing data gathered for the particular country. For example, if marketing data suggests that different color schemes produce more efficient results for different countries, the various web marketing campaigns may be created with varying color schemes to maximize the efficiency of a web marketing campaign.

While it has been contemplated that the application 105 may tailor individual marketing campaigns for countries, one of ordinary skill in the art will appreciate that individual marketing campaigns may likewise tailored to other targets such as specific consumers, business entities, and states— just to name a few.

In some embodiments, content authors may create folder structures for storing marketing campaign data that may be utilized by the application 105 via a webDAV connector 140. Content authors may add, edit, delete, and use content that is utilized in the generation of web marketing campaigns in the same way that they would use the Windows file system. For example, content authors may access folder structures using a web browser application or any other suitable desktop application resident on the client device 110.

According to some embodiments, the application 105 may include a content porter module 145 adapted to facilitate the exchange of data between the database 120 associated with the web server 115 and at least one of the application 105 and the client devices 110. In other embodiments, the content porter module 145 provides content authors the ability to develop marketing content and/or web site functionalities apart from the live version (e.g., the version currently published on the presentation server 155) of the web site 300. As stated above, an exemplary visual representation of web site 300 is provided in FIG. 3, and will be described in greater detail below. The application 105 may then transfer the developed marketing content to the application 105, which facilitates the inclusion of the developed content to the live version of the web site 300.

The content porter module 145 may be adapted to transfer data between different versions or instances of the application 105 running on multiple client devices 110 (e.g., collaborative web marketing campaign creation). The application 105 may be adapted to assemble the portions of the web marketing campaign created by the various content authors into one or more cohesive web marketing campaigns.

Regardless of how the application 105 generates the web marketing campaign(s) (e.g., automatically, via collaborative effort, etc.), the web marketing campaigns may be published to a web site associated with the presentation server 155 via the content distributor module 160. As the web marketing campaigns are published on a presentation server 155, the web marketing campaigns may be accessed via consumer devices 165A or consumer portals 165B via a consumer device 165A. It will be understood that the consumer portal 165B may include a web site operated by a marketer or utilized by a marketer to deliver web marketing campaign (e.g., banner advertisement).

Figure 4:
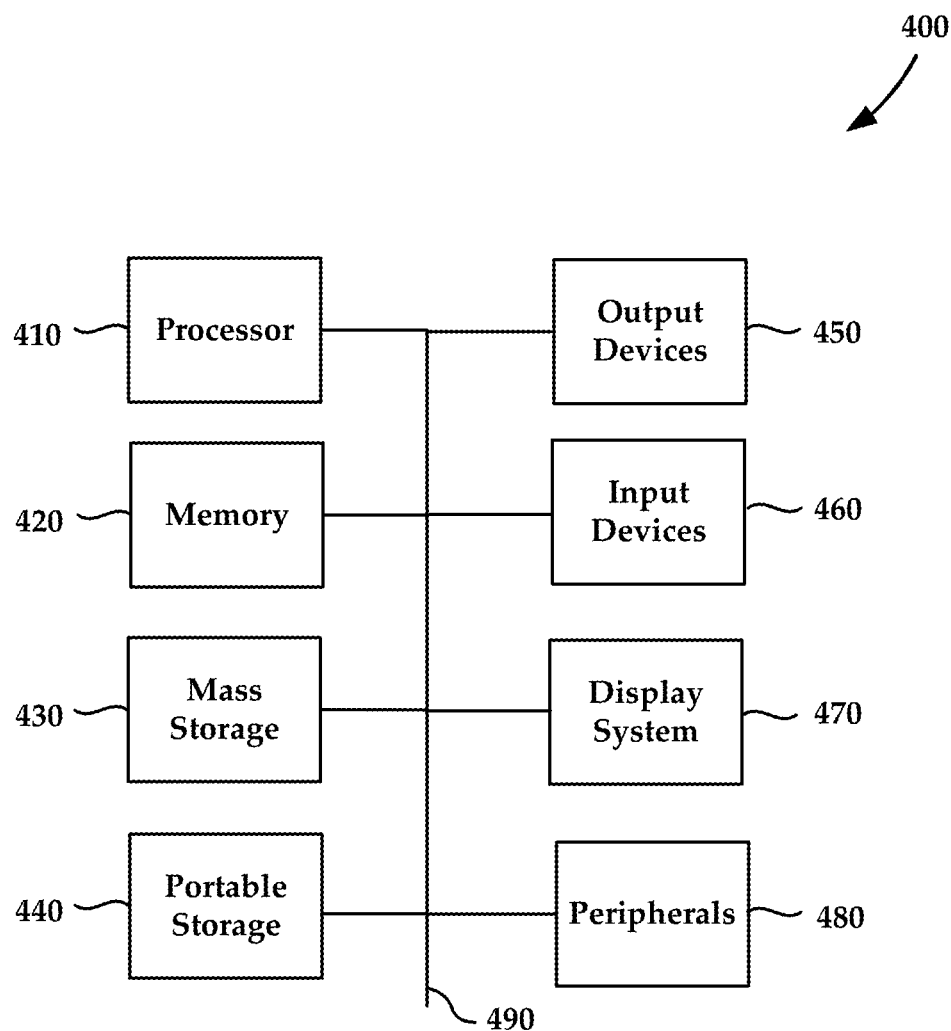
FIG. 4 is a block diagram of an exemplary computing system that may be utilized to practice aspects of the present disclosure.

It will be understood that consumer devices 165A may include computing systems of any kind, and may generally be described with reference to computing system 400 (FIG. 4). It is noteworthy that the presentation server 155 and the web server 115 hosting the application 105 may be combined together.

The system 100 may include a visitor intelligence module 170 adapted to gather, via the presentation server 155, marketing data from the plurality of consumer devices 165A accessing the web marketing campaign. It will be understood that each of the consumer devices 165A may be associated with an individual consumer (i.e., end user) such that an analysis data provided by the consumer devices 165A may yield information indicative of the end user (i.e., consumer) associated therewith. According to some embodiments, the marketing data may include information indicative of the interests of the consumer.

Additionally, the visitor intelligence module 170 may be adapted to analyze information received from the consumers accessing a web marketing campaign via consumer portal 165B.

Generally speaking, the marketing data may include any of a consumer name, a consumer identification, an address, a postal code, a telephone number, a credit card number, a social networking profile, an Internet protocol address, a media access control (MAC) address, visitation duration, visitation frequency, and combinations thereof. One of ordinary skill in the art will appreciate that many other types of information indicative of a consumer may likewise be utilized in accordance with the present invention.

In some embodiments, the visitor intelligence module 170 may be adapted to gather marketing data by examining at least one of a cookie, a web form associated with the presentation server hosting the web marketing campaign, a query string embedded in a uniform resource locator (URL) associated with the presentation server hosting the web marketing campaign, window.name information associated with a web browser session, hyper text transfer protocol authentication information, and combinations thereof.

The marketing data gathered by the visitor intelligence module 170 may be stored in a raw format on the database 120 via the content porter module 145. In addition to creating lists of consumers to which marketing campaigns may be directed by utilizing basic raw data such as names, or addresses, the visitor intelligence module 170 may be adapted to create lists based up the one or more consumer groups. For example, a marketing content author, such as an individual creating electronic mail marketing campaigns, may author content that is directed to all consumers that belong to the consumer group of "baseball." Therefore, rather than sending electronic mail marketing campaigns to all consumers identified by the visitor intelligence module 170, directed electronic mail marketing campaigns may be directed to consumers that are known to have an interest in the content of the electronic mail marketing campaign, which in this instance may include a sale on baseball related sports memorabilia.

The content author creates the electronic mail marketing campaign via the application 105 and retrieves the particular consumer groups to which the electronic mail marketing campaign should be directed from the application 105. The application 105 then provides the selected consumer groups to the content author via a business connector module 175.

Figure 1B:
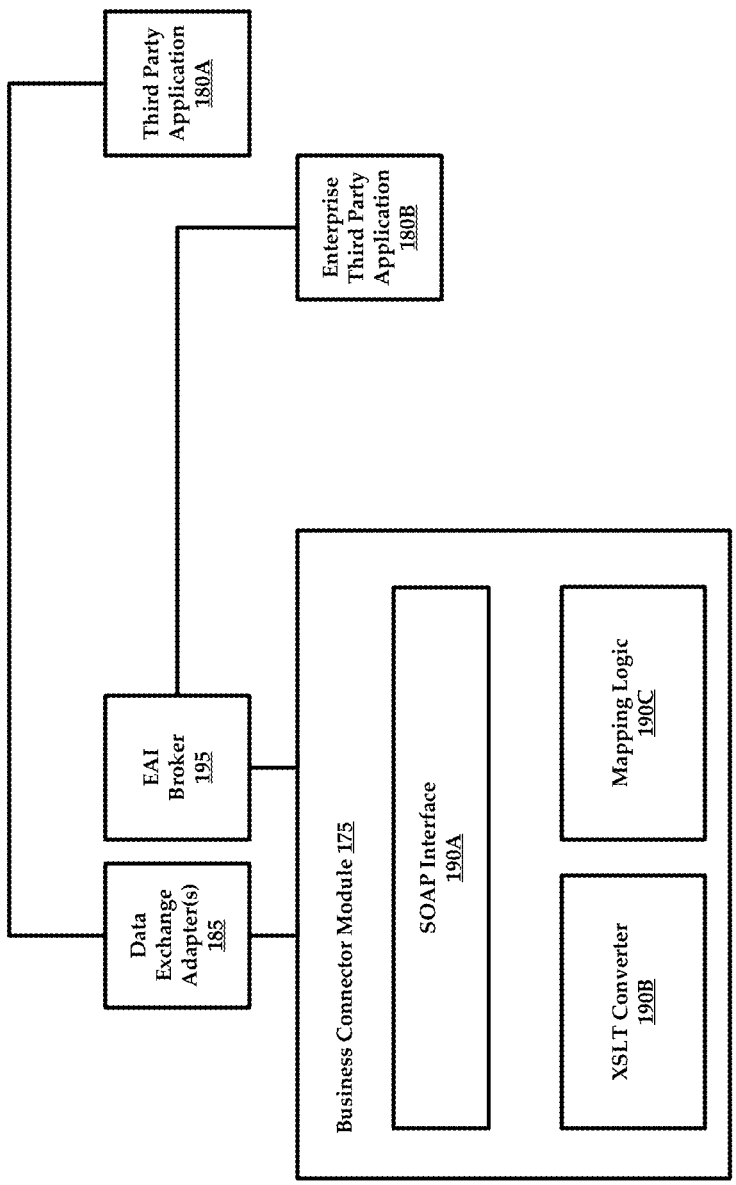
FIG. 1B is a partial schematic diagram of the exemplary architecture of FIG. 1A.

Referring now to FIGS. 1A and 1B collectively, the application 105 may include the business connector module 175 adapted to interface the application 105 with one or more third party application(s) 180A by way of one or more data exchange adapters 185. In addition to data exchange adapters 185, the business connector module 175 may be adapted to communicate directly with third party applications 180A such as Java-based applications.

As stated above, the application 105 may be adapted to utilize a dynamic rendering engine (not shown) and dynamic rendering engine data format that allows implementers to abstract dynamic functionalities (from a third party application 180A) to a predetermined format (that is intercepted and rendered by the dynamic rendering engine). Data abstracted to the predetermined format may be utilized as a portion of a core development implementation before being passed back to the requester.

In some embodiments, the data exchange adapter 185 may be adapted to convert at least one of the marketing data gathered by the visitor intelligence module 170 and the one or more consumer groups created by the visitor intelligence module 170, to the data format utilized by the third party application 180A. For example, the third party application 180A may include applications such as a web page design application, a graphics editing program, and the like that may be utilized to create marketing content that may be incorporated into the web marketing campaign.

The data exchange adapter 185 may interface with web-service enabled third party applications 180A utilizing a simple object access protocol (SOAP) interface 190A, an extensible stylesheet language transformations (XSLT) transformer 190B, and mapping logic module 190C.

In other embodiments, the business connector module 175 may utilize an enterprise application integration broker 195 to exchange data with one or more enterprise third party programs 180B. For example, the broker 195 may be adapted to facilitate the exchange of data between an enterprise third party application 180B such as an email server application, and the business connector module 175 by determining a data format utilized by the enterprise third party application 180B, which in this case includes simple mail transfer protocol (SMTP) format. In practice, a content author may provide content via an electronic mail message. The data exchange adapter 185 receives the message that is converted by the XSLT transformer 190B to a data format utilized by the application 105, i.e., XML format. The mapping logic module 190C may be adapted to index the data format exchange information established between the SOAP interface 190A and the enterprise third party application 180B.

It will be understood that the business connector module 175 may be adapted to provide at least one of the raw marketing data and the one or more consumer groups gathered by the visitor intelligence module 170 to one or more of the third party applications 180A or enterprise third party applications 180B. For example, the data exchange adapter 185 may convert the marketing data gathered by the visitor intelligence module 170 in XML format to a data format that is utilized by a web page design application.

With regard to modifying the content of a web marketing campaign based upon marketing data, the system 100 may include a dynamic broker module 155A associated with the presentation server 155. The dynamic broker module 155A may be adapted to selectively modify a web marketing campaign based upon the marketing data received by the visitor intelligence module 170. For example, the dynamic broker module 155A may modify the web marketing campaign to include different advertisements directed to products from a product catalogue of a marketer based upon the interests of the consumers viewing the web marketing campaign, as determined by the visitor intelligence module 170.

In other embodiments directed to consumers who utilize mobile devices, the dynamic broker module 155A may be adapted to determine a configuration of each mobile consumer device requesting the web marketing campaign. The dynamic broker module 155A may determine the configuration of a mobile consumer device by evaluating the international mobile equipment identifier (IMEI) of the mobile consumer device. By analyzing the IMEI, a mobile device operating system version may be determined, along with other pertinent information. Utilizing the gathered information, the dynamic broker module 155A may cause the provision of a version of the web marking campaign (via the presentation server 155) to the mobile consumer device that may be substantially compatible with the mobile device operating system version of the device.

In other embodiments, the dynamic broker module 155A may be utilized to periodically or continually modify the content of a web marketing campaign based upon an analysis of marketing data. For example, marketing data received from the consumer devices 165A may indicate that a particular web marketing campaign is underperforming (i.e., not generating the proper number of click through instances or generating enough sales). As such, the interests of the consumers accessing the web marketing content may indicate that a change in the products included in the web marketing campaign may more closely coincide with the interests of the consumer groups. Therefore, the application 105 may modify the content of the web marketing campaign to substantially correspond to the interests of the consumers. Moreover, this type of dynamic modification may take place on a granular level (i.e., at the individual consumer level).

FIG. 2 illustrates an exemplary flow chart of a method 200 for managing web content. The method 200 may include the step 205 of providing a web content management application via a web site. The web content management application may be coupled to a web server associated with the web site. Moreover, the web content management application may be adapted to maintain a global marketing framework indicative of a marketing campaign.

Next, the method 200 may include the step 210 of generating a web marketing campaign from at least a portion of the global marketing framework, via the web server, which in some embodiments includes a presentation server. In an additional embodiment, the method 200 may include the step 215 of gathering, via the web server (or the presentation server), marketing data from a plurality of consumer devices accessing the web marketing campaign. It will be understood that each of the consumer devices may be associated with a consumer and that the marketing data may include information indicative of interests of the consumer associated with the consumer device.

Additionally, the method 200 includes the step 220 of storing the marketing data in a database and a step 225 of associating consumers together according to at least one common interest to create one or more consumer groups. The method 200 may also include the step 230 of providing the one or more consumer groups to at least one marketing content author such that the web marketing campaign delivered to the consumer groups may be tailored to the interests of the consumer.

The method 200 may include an additional step 235 of interfacing the application with one or more third party applications via the use of a data exchange adapter or an EAI broker. The method 200 may also include a step 240 of selecting an appropriate version of the web marketing campaign to deliver to a mobile consumer device by evaluating the mobile device information indicative of the mobile consumer device and selecting a version of the web marketing campaign that corresponds to the mobile consumer device. Additionally, the method 200 may include the step 245 of selectively modifying the web marketing campaign based upon the marketing data to increase the efficiency of the marketing campaign.

Figure 3:
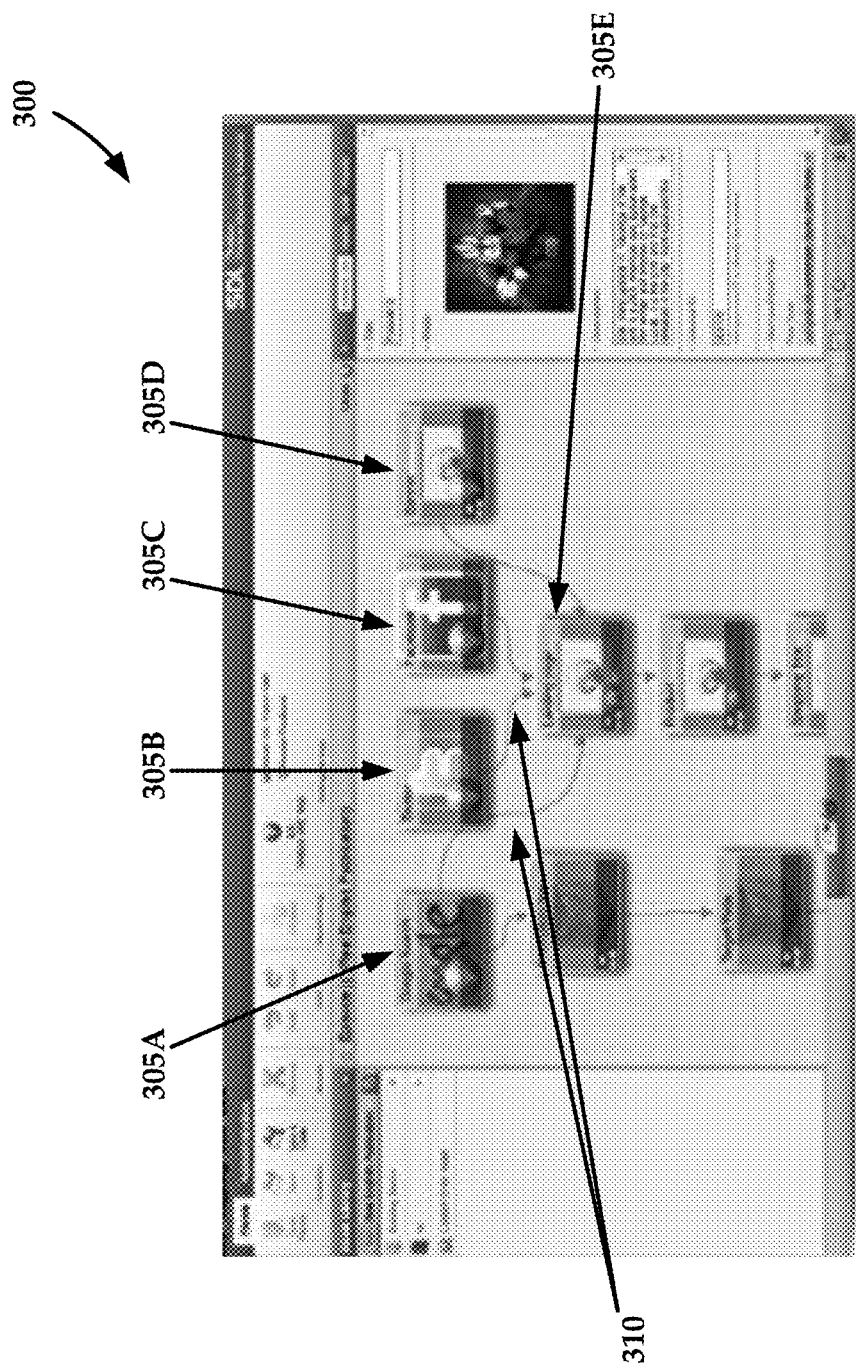
FIG. 3 is an exemplary user interface in the form of a web page for interacting with a web content management application.

FIG. 3 illustrates an exemplary user interface 300 that allows content authors to interact with the application 105. Generally speaking, the user interface 300 generated by the application 105 may provide content authors with a What You See Is What You Get (WYSIWYG) representation of the web marketing campaign. That is, the user interface 300 generated by the application 105 may include a representation of the web marketing campaign that is identical, nearly identical, or to the actual visual appearance of the web marketing campaign that is published by on the presentation server 155. As additional content is added to the web marketing campaign, the user interface is updated to include the new content.

The user interface 300 may include a plurality of block icons 305A-D indicative of individual web marketing campaigns. More particularly, each of the block icons 305A-D may be indicative of a web marketing campaign for a particular communication channel. Block icon 305A includes a web marketing campaign that may be directed to a search engine. Block icon 305B includes a web marketing campaign that may be directed to a first social networking application and block icon 305C to a second social networking application. Additionally, block icon 305D may be directed to a banner advertisement that may be directed to any suitable web site.

The user interface 300 includes visual representations of the relationships of the individual web marketing campaigns relative to one another via directional arrows 310. For example, the directional arrows 310 linking each of the block icons 305A-D may indicate that each of the web marketing campaigns associated with the block icons 305A-D direct consumers to the landing page (represented visually by block icon 305E) of a marketer's website.

As stated previously, the web content management system described above also includes an extensible framework that allows implementers to add extra data obtained through third parties sources/software, as well as associated third party workflow into the web content management application. It will be understood that the term "implementer" may include individuals producing computer readable instructions that may be utilized to modify the appearance or functionalities of the web content management application.

It is noteworthy that some embodiments according to the present technology support a variety of web browsers. Examples include but are not limited to Internet Explorer, Firefox, Chrome, Safari, Opera, various mobile browsers, and so forth. It may be desirable, in certain instances, for a user to be able to extend the graphical user interface (GUI). Advantageously, the system is adapted to allow users (or content authors) to customize the GUI to include features that they commonly use, rather than loading a plurality of features that the user may not need.

It various embodiments, the user possesses the ability specify how the desired add-in features are included in the GUI. For example, a feature such as "rename" may be included in a right-click mouse menu (for example), in an icon included in a toolbar, and so forth. The system may also allow users to change the visual appearance of their GUI, for example, by adding or subtracting columns that provide various types of information. The flexible architecture used for the GUI allows for enhanced extensibility so that users may extend functionality and customizations.

In some embodiments, a centralized model repository is implemented. The inclusion of this centralized model repository may allow for the editors, and the different screens of the editors, to communicate with main model items hosted in a single place. In other words, it is envisioned that when there is a change in a single location in the model repository, the various editors and views may be notified about the change. In exemplary embodiments, when an editor makes a change, the editor makes the change in the centralized model repository. Further, the system may support object models with inheritance of the extended Java script language, thus allowing for the building of object models with inheritance. The inclusion of a configuration framework allows the plug in of new models, editors, and so forth.

FIG. 4 illustrates an exemplary computing system 400 that may be used to implement an embodiment of the present invention. The computing system 400 of FIG. 4 includes one or more processors 410 and main memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 440, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 410.

Portable storage device 440 operates in conjunction with a portable non-volatile storage medium, such as a floppy disk, compact disk or digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. Peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Mac OS, Palm OS, and other suitable operating systems.

The computer system 400 may also include a mobile computing device that may have a configuration that includes at least one of a mobile operating system having an operating system version number. Additionally, mobile device may be identified by way of an international mobile equipment identifier (IMEI).

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for selectively modifying web content, comprising:
   providing a web content management application via a web site, the web content management application coupled to a web server associated with the web site, the web content management application adapted to maintain a global marketing framework indicative of a marketing campaign;
   generating a web marketing campaign from at least a portion of the global marketing framework, wherein data included in the web content is generated by the web content management application according to a predetermined format of rendering engines, rather than from data formats utilized by standard web applications, the rendering engines configured to render dynamic links that ensure that the web site does not include broken links to associated internal pages, the rendering engines further configured by:
      intercepting the data abstracted to the predetermined format before rendering;
      utilizing the predetermined format as part of a core development implementation; and
      passing the data back to a requester after processing through the rendering engines;
   adding tag libraries in Java so as to render web application functionalities without requiring deployment of a web application, the tag libraries being available to the rendering engines;
   gathering, via the web server, marketing data from at least one of the web server associated with the web marketing campaign and consumer devices accessing the web marketing campaign, the marketing data including information indicative of interests of consumers, the gathering including determining configurations of mobile consumer devices by analyzing International Mobile Equipment Identifier (IMEI) information and mobile device operating system versions;
   storing the marketing data in a database;
   analyzing the marketing data; and
   based on the analysis of information received from the consumers accessing the web marketing campaign via a consumer portal, selectively and dynamically modifying the web content of the web marketing campaign based on the information received from the consumers, the selectively and dynamically modifying includes providing device-specific versions of the web marketing campaign to the mobile consumer devices based on the analyzed IMEI information and mobile device operating system versions.

2. The method according to claim 1, wherein the selectively and dynamically modifying the web content of the web marketing campaign further comprises selectively and dynamically modifying an appearance of the web marketing campaign based upon the marketing data gathered for a particular country.

3. The method according to claim 1, wherein the selectively and dynamically modifying the web content of the web marketing campaign further comprises selectively and dynamically modifying an appearance of the web marketing campaign utilizing a specific color scheme, based upon the marketing data gathered for a particular country.

4. The method according to claim 1, wherein the selectively and dynamically modifying the web content of the web marketing campaign is performed by a dynamic broker module.

5. The method according to claim 1, wherein the marketing data includes at least one of a consumer name, a consumer identification, an address, a postal code, a telephone number, a credit card number, a social networking profile, an Internet protocol address, a media access control (MAC) address, visitation duration, visitation frequency, and combinations thereof.

6. The method according to claim 1, wherein the marketing data is gathered from at least one of a cookie, a web form associated with the web marketing campaign, a query string embedded in a uniform resource locator (URL) associated with the web marketing campaign, window.name information associated with a web browser session, hyper text transfer protocol authentication information, and combinations thereof.

7. The method according to claim 1, further comprising:
associating the consumers together according to at least one common interest to create one or more consumer groups; and
providing the one or more consumer groups to at least one marketing content author such that the web marketing campaign delivered to the one or more consumer groups is tailored to the interests of the consumers.

8. The method according to claim 1, further comprising:
integrating the web content management application with a third party application by way of a data exchange adapter.

9. The method according to claim 8, wherein the consumer devices are provided to the third party application via the data exchange adapter.

10. The method according to claim 1, further comprising:
selecting an appropriate version of the marketing campaign to deliver to a consumer device by evaluating mobile device information indicative of the mobile consumer device and selecting a version of the web marketing campaign that corresponds to the mobile consumer device.

11. The method according to claim 8, wherein the data exchange adapter is adapted to utilize simple object access protocol.

12. The method according to claim 1, wherein the generating further includes:

determining a configuration of a mobile consumer device requesting the web marketing campaign; and
providing a compatible version of the web marketing campaign to the mobile consumer device.

13. A system for selectively modifying web content, comprising:
a web server associated with a web site;
the web site having a web content management application associated therewith, the web content management application coupled to a web server associated with the web site, the web content management application including computer-readable instructions comprising:
a content manager module adapted to:
maintain a global marketing framework indicative of a marketing campaign;
generate a web marketing campaign from at least a portion of the global marketing framework, wherein data included in the web content is generated by the web content management application according to a predetermined format of rendering engines, rather than from data formats utilized by standard web applications, the rendering engines configured to render dynamic links that ensure that the web site does not include broken links to associated internal pages, the rendering engines further configured by intercepting the data abstracted to the predetermined format before rendering, utilizing the predetermined format as part of a core development implementation, and passing the data back to a requester after processing through the rendering engines; and
add tag libraries in Java so as to render web application functionalities without requiring deployment of a web application, the tag libraries being available to the rendering engines;
a visitor intelligence module adapted to:
gather, via the web server, visitor information and marketing data from at least one of the web server associated with the web marketing campaign and consumer devices accessing the web marketing campaign, the visitor information including International Mobile Equipment Identifier (IMEI) information, operating system versions determined from mobile consumer devices by analyzing the IMEI information and information indicative of interests of consumers; and
associate consumer interactions with persistent device identifiers derived from the IMEI information;
a content porter module for storing the visitor information and the marketing data in a database, the storing including indexing by the IMEI information to create device-specific profiles in a database;
a business connector module adapted to interface the web content management application with a third party application through an XSLT transformer for converting data formats and a mapping logic module that indexes data format exchange information between SOAP interfaces and enterprise applications; and
a dynamic broker module adapted to:
analyze the stored visitor information and the nmarketing data, the analyzing including segmenting consumers into cohorts based on similarities in the IMEI information and the mobile device operating system versions;

based on the analysis of the information received from the consumers accessing the web marketing campaign via a consumer portal, selectively and dynamically modify presentation logic and the web content of the web marketing campaign based on the information received from the consumers; and provide device-specific versions of the web marketing campaign to the mobile consumer devices based on the analyzed IMEI information and the mobile device operating system versions.

14. The system according to claim 13, wherein the dynamic broker module is further adapted to selectively and dynamically modify an appearance of the web marketing campaign based upon the marketing data gathered for a particular country.

15. The system according to claim 13, wherein the dynamic broker module is further adapted to selectively and dynamically modify an appearance of the web marketing campaign utilizing a specific color scheme, based upon the marketing data gathered for a particular country.

16. The system according to claim 13, wherein the marketing data includes at least one of a consumer name, a consumer identification, an address, a postal code, a telephone number, a credit card number, a social networking profile, an Internet protocol address, a media access control (MAC) address, visitation duration, visitation frequency, and combinations thereof.

17. The system according to claim 13, wherein the visitor intelligence module is adapted to gather the marketing data from at least one of a cookie, a web form associated with a presentation server hosting the web marketing campaign, a query string embedded in a uniform resource locator (URL) associated with the presentation server hosting the web marketing campaign, window.name information associated with a web browser session, hyper text transfer protocol authentication information, and combinations thereof.

18. The system according to claim 13, further comprising a business connector module adapted to interface the web content management application with the third party application by way of a data exchange adapter.

19. The system according to claim 18, wherein the data exchange adapter is adapted to utilize simple object access protocol.

20. The system according to claim 18, wherein the business connector module is further adapted to interface the web content management application with the third party application by way of an enterprise application integration broker.

* * * * *